US012633755B2

(12) United States Patent
Zhang et al.

(10) Patent No.: US 12,633,755 B2
(45) Date of Patent: May 19, 2026

(54) PREDICTIVE CONTROL METHOD AND SYSTEM OF GRID-CONNECTED CONVERTER BASED ON STRUCTURALLY ADAPTIVE EXTENDED STATE OBSERVER

(71) Applicant: SHANDONG UNIVERSITY, Shandong (CN)

(72) Inventors: Zhenbin Zhang, Shandong (CN); Oluleke Babayomi, Shandong (CN); Zhen Li, Shandong (CN); Cungang Hu, Shandong (CN); Zhonggang Yin, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 376 days.

(21) Appl. No.: 18/565,518

(22) PCT Filed: May 26, 2023

(86) PCT No.: PCT/CN2023/096637
§ 371 (c)(1),
(2) Date: Nov. 30, 2023

(87) PCT Pub. No.: WO2024/037096
PCT Pub. Date: Feb. 22, 2024

(65) Prior Publication Data
US 2025/0096576 A1      Mar. 20, 2025

(30) Foreign Application Priority Data

Aug. 15, 2022    (CN) ......................... 202210973296.X

(51) Int. Cl.
*H02J 3/38* (2026.01)
*H02J 3/00* (2026.01)
(Continued)

(52) U.S. Cl.
CPC ............... *H02J 3/381* (2013.01); *H02J 3/002* (2020.01); *H02J 2103/30* (2026.01); *H02J 2103/35* (2026.01)

(58) Field of Classification Search
None
See application file for complete search history.

(56) References Cited

U.S. PATENT DOCUMENTS 9,584,044 B2 *   2/2017   Zhou ................... H02M 7/5381
2018/0026449 A1   1/2018   Benosman et al.

FOREIGN PATENT DOCUMENTS

CN          107134964          9/2017
CN          109921669          6/2019
(Continued)

OTHER PUBLICATIONS

"International Search Report (Form PCT/ISA/210) of PCT/CN2023/096637," mailed on Jul. 10, 2023, with English translation thereof, pp. 1-8.
(Continued)

*Primary Examiner* — Mohammad Ali
(74) *Attorney, Agent, or Firm* — JCIPRNET

(57) ABSTRACT

A predictive control method of a grid-connected converter based on a structurally adaptive extended state observer (ESO) is provided. The method includes: obtaining data of a grid current and a grid voltage and converting the data to data in a dq coordinate system; calculating a selected voltage vector based on a voltage in the dq coordinate system; adaptively inputting the current in the dq coordinate system to a parallel ESO, a cascade ESO, or a hybrid cascade-parallel ESO, so as to obtain a current predicted current value and estimated total disturbance; carrying out a two-step grid current prediction based on the current predicted current value, the estimated total disturbance and the selected voltage vector; and taking minimizing a cost func-
(Continued)

tion as a control target, so as to obtain an optimal voltage vector based on a two-step grid current prediction result, and carrying out switching control of the grid-connected converter.

6 Claims, 5 Drawing Sheets

(51) Int. Cl.
*H02J 103/30* (2026.01)
*H02J 103/35* (2026.01)

(56) References Cited

FOREIGN PATENT DOCUMENTS

| | | |
|---|---|---|
| CN | 110943657 | 3/2020 |
| CN | 112994482 | 6/2021 |
| CN | 114172425 | 3/2022 |
| CN | 114665512 | 6/2022 |
| CN | 114865934 | 8/2022 |
| CN | 115276094 | 11/2022 |

OTHER PUBLICATIONS

"Written Opinion of the International Searching Authority (Form PCT/ISA/237) of CT/CN2023/096637," mailed on Jul. 21, 2023, with English translation thereof, pp. 1-9.

* cited by examiner

PREDICTIVE CONTROL METHOD AND SYSTEM OF GRID-CONNECTED CONVERTER BASED ON STRUCTURALLY ADAPTIVE EXTENDED STATE OBSERVER

CROSS-REFERENCE TO RELATED APPLICATION

This application is a 371 of international application of PCT application serial no. PCT/CN2023/096637, filed on May 26, 2023, which claims the priority benefit of China application no. 202210973296.X, filed on Aug. 15, 2022. The entirety of each of the above-mentioned patent applications is hereby incorporated by reference herein and made a part of this specification.

BACKGROUND

Technical Field

The present invention relates to the technical field of grid-connected converter control, in particular to a predictive control method and system of a grid-connected converter based on a structurally adaptive extended state observer (ESO).

Description of Related Art

The statements in this part only provide background information related to the present invention and do not necessarily constitute the prior art.

Model predictive control (MPC) is a control technique based on optimization. It utilizes a dynamic model to predict future evolution of a system state and an output. A control target of a grid-connected converter is determined by using optimization variables of a grid current. At each time step, an optimization problem is solved within a predicted range. A final converter which is found be capable of solving the problem controls an input sequence. Finally, only a first input of the sequence is applied to the system. A major challenge with the MPC is that its dynamic performance degrades when uncertainty of the model occurs. Therefore, model-free predictive control without explicit use of model parameters is necessary to overcome this challenge.

In the model-free predictive control of the grid-connected converter, a traditional extended state observer (ESO) operates under a specific bandwidth. A high gain calculated at bandwidth frequencies is used to estimate the grid current and total disturbance.

For the model-free predictive control of the grid-connected converter, the ESO requires two important characteristics: 1) high disturbance rejection, and 2) good suppression of high-frequency measurement noise.

However, the traditional ESO only has one of these qualities at a time, and existing solutions that improve the disturbance rejection of the ESO generally lead to poor noise suppression, while solutions that improve the noise suppression of the ESO generally lead to worse disturbance rejection. In addition, the traditional ESO with good noise suppression of a sensor-based measurement output has a high start-up transient peak when sudden external disturbance occurs, and it also experiences an unsatisfactory transient oscillation when a system bandwidth is low.

SUMMARY

In order to solve the above problems, the present invention proposes a predictive control method and system of a grid-connected converter based on a structurally adaptive ESO, which adapts to real-time conditions by adaptively changing a structure of an ESO and ensures smooth transition of the structure of the observer during real-time operations of a device.

In some embodiments, the following technical solutions are used:

A predictive control method of a grid-connected converter based on a structurally adaptive ESO, comprising: obtaining data of a grid current and a grid voltage and converting the data to data in a dq coordinate system; calculating a selected voltage vector based on a voltage in the dq coordinate system; adaptively inputting a current in the dq coordinate system to a parallel ESO, a cascade ESO, or a hybrid cascade-parallel ESO, so as to obtain a current predicted current value and estimated total disturbance; carrying out a two-step grid current prediction based on the current predicted current value, the estimated total disturbance and the selected voltage vector; taking minimizing a cost function as a control target, so as to obtain an optimal voltage vector based on a two-step grid current prediction result, and carrying out switching control of the grid-connected converter.

As a further embodiment, a specific method of adaptively inputting a current in the dq coordinate system to a parallel ESO, a cascade ESO, or a hybrid cascade-parallel ESO, so as to obtain a current predicted current value and estimated total disturbance is as follows: determining whether a d-axis current component in the dq coordinate system is a starting current or a disturbance current; if yes, firstly predicting the current predicted current value and the estimated total disturbance by using the parallel ESO according to the current in the dq coordinate system; after ½ cycle, predicting the current predicted current value and the estimated total disturbance by using a hybrid cascade-parallel ESO with a first set bandwidth; after ½ cycle, predicting the current predicted current value and the estimated total disturbance by using a hybrid cascade-parallel ESO with a second set bandwidth; after ½ cycle, predicting the current predicted current value and the estimated total disturbance by using the cascade ESO; after preset cycles, returning to obtaining the d-axis current component in the dq coordinate system again; if not, firstly predicting the current predicted current value and the estimated total disturbance by directly using the cascade ESO according to the current in the dq coordinate system.

As a further embodiment, a specific method of determining whether a d-axis current component in the dq coordinate system is a starting current or a disturbance current is as follows:

When the following formula is satisfied, the starting current or disturbance current appears:

$$\Delta i_{d\_4} = \left| \int_0^{t\_4} \frac{d}{dt} i_d d\tau \right| \geq 0.01 i_{d\_max}$$

Wherein $\Delta i_{d\_4}$ is an absolute change value of the d-axis current $i_d$ after 4 times of sampling of the d-axis current, $t\_4 = 4/T_s$ and, $T_s$ is the sampling time, and $i_{d\_max}$ is a maximum d-axis grid current.

As a further embodiment, the hybrid cascade-parallel ESO is specifically:

$$\dot{\hat{z}}_1(t) = \hat{F}_1(t) + \alpha u(t) - \gamma_{11}(\hat{z}_1(t) - y(t))$$

$$\hat{F}_1(t) = -\gamma_{21}(\hat{z}_1(t) - y(t))$$

$$\dot{\hat{z}}_2(t) = \sum_{j=1}^{2}\hat{F}_j(t) + \alpha u(t) - \gamma_{12}[\hat{z}_2(t) - \hat{z}_1(t)]$$

$$\dot{\hat{F}}_2(t) = -\gamma_{22}[\hat{z}_2(t) - \hat{z}_1(t)]$$

$$\dot{\hat{z}}_3(t) = \sum_{j=1}^{3}\hat{F}_j(t) + \alpha u(t) - \gamma_{13}[\hat{z}_3(t) - \hat{z}_1(t)]$$

$$\dot{\hat{F}}_3 = -\gamma_{23}[\hat{z}_3(t) - \hat{z}_1(t)]$$

Wherein $\dot{\hat{z}}_j(t)$ is a first order derivative of time $\hat{z}_j(t)$, $\hat{z}_j(t)$ is an ESO state variable of an estimated current predicted current $\hat{i}_{dq,j}(t)$, $y(t)$ is a measured noisy output signal, $\{\gamma_{1j}, \gamma_{2j}\} \forall j \in [1,2,3]$ is a gain of an ESO of $ESO_j$, wherein $\omega_0=$is a total bandwidth of an ESO system, $\alpha$ is a gain of a constant control input; $u(t)$ is a controller input.

As a further embodiment, the steps of carrying out a two-step grid current prediction based on the current predicted current value, the estimated total disturbance and the selected voltage vector is specifically as follows:

The current predicted current value is a result obtained after adaptively inputting to the parallel ESO, the cascade ESO or the hybrid cascade-parallel ESO, that is, a result obtained in a first prediction step;

A result of a second current prediction step is as follows:

$$\hat{i}_{dq}(k+2) = \hat{i}_{dq}(k+1) + T_S\left[\sum_{j=1}^{3}\hat{F}_j(k+1) + \alpha u(k)\right]$$

Wherein k is sampling instant, $T_s$ is sampling time, $\hat{i}_{dq}(k+1)$ is the result obtained in the first prediction step and is a predicted estimated value of the grid current at the next sampling instant (k+1), $\alpha$ is a constant control input gain, u(k) is a voltage of the converter caused by a switching state Sabc(k); $\hat{F}_j(k+1)$ is a predicted disturbance value of the first step at a jth sub-frequency level $\omega_{0j}$.

As a further embodiment, in the step of taking minimizing the cost function as the control target, so as to obtain the optimal voltage vector, the cost function is as follows:

$$J = \left[\hat{i}_{dq}(k+2) - i_{dq}^*(k+2)\right]^2$$

Wherein $\hat{i}_{dq}(k+2)$ is a predicted estimated value of the grid current at sampling instant (k+2), and $$i_{dq}^*(k+2)$$

is a reference value of the grid current at the sampling instant (k+2).

As a further embodiment, each switching state voltage of a three-phase two-level grid-connected converter is evaluated in the cost function; and a switching state corresponding to a voltage $u_{dq}$ with the minimum value of the cost function is applied as the switching state Sabc of the grid-connected converter.

In some other embodiments, the following technical solutions are used:

A predictive control system of a grid-connected converter based on a structurally adaptive ESO, comprising: a data obtaining module, configured for obtaining data of a grid current and a grid voltage and converting the data to data in a dq coordinate system; a voltage vector selecting module, configured for calculating a selected voltage vector based on a voltage in the dq coordinate system; an adaptive state observing module, configured for adaptively inputting a current in the dq coordinate system to a parallel ESO, a cascade ESO, or a hybrid cascade-parallel ESO, so as to obtain a current predicted current value and estimated total disturbance; a two-step predicting module, configured for carrying out a two-step grid current prediction based on the current predicted current value, the estimated total disturbance and the selected voltage vector; a grid-connected converter controlling module, configured for taking minimizing a cost function as a control target, so as to obtain an optimal voltage vector based on a two-step grid current prediction result, and carrying out switching control of the grid-connected converter.

In some other embodiments, the following technical solutions are used:

A terminal device, comprising a processor and a memory, wherein the processor is used to implement each instruction; and the memory is used to store a plurality of instructions, and the instructions are suitable for being loaded by the processor and executing the above-mentioned predictive control method of a grid-connected converter based on a structurally adaptive ESO.

In some other embodiments, the following technical solutions are used:

A computer-readable storage medium in which a plurality of instructions are stored, wherein the instructions are suitable for being loaded by a processor of a terminal device and executing the above-mentioned predictive control method of a grid-connected converter based on a structurally adaptive ESO.

Compared with the prior art, the beneficial effects of the invention are as follows:

The present invention guarantees excellent disturbance rejection and noise suppression under all operating conditions by means of a structurally adaptive state observer, minimizing overshoot and ripple during transient periods, protecting the device from an excessive starting current and suppressing oscillations caused by bandwidth limitations or external disturbance; and the structurally adaptive state observer of the present invention can be adaptively modified to adapt to the time-varying control target.

Other features and advantages of additional aspects of the present invention will be partly given in the description below, and will partly become apparent from the description below, or will be learned through practice in this area.

DESCRIPTION OF THE EMBODIMENTS

It should be noted that the following detailed explanations are illustrative and are intended to provide further explanations of this application. Unless otherwise indicated, all technical and scientific terms used in the present invention have the same meaning as that would normally be understood by a person of ordinary skill in the technique field to which this application belongs.

It should be noted that the terms used herein are intended only to describe specific embodiments and are not intended to limit exemplary embodiments under this application. As used herein, a singular form is also intended to include a plural form unless the context expressly indicates otherwise, and it should also be understood that when terms "contain" and/or "include" are used in this specification, they indicate the presence of features, steps, operations, devices, components and/or combinations thereof.

Example 1

Figure 1:
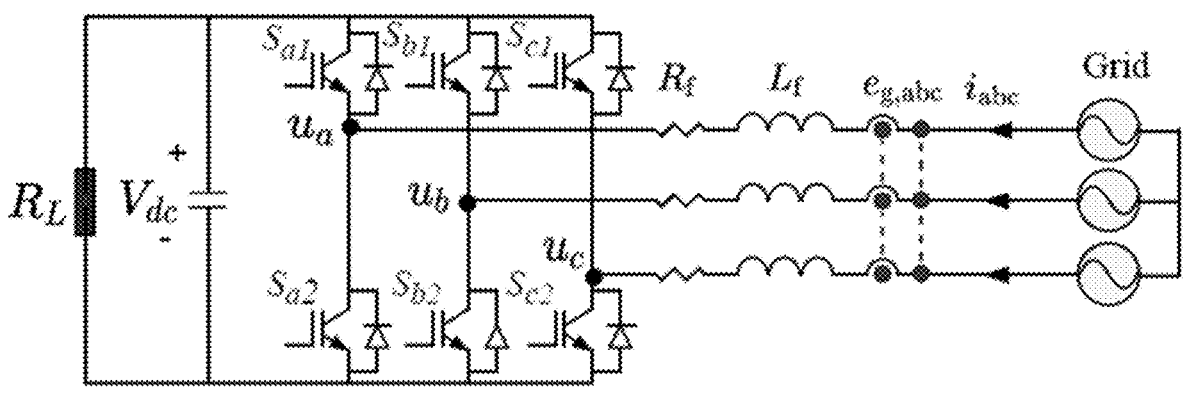
FIG. 1 is a structurally schematic diagram of a three-phase grid-connected converter in an example of the present invention.
Figure 4:
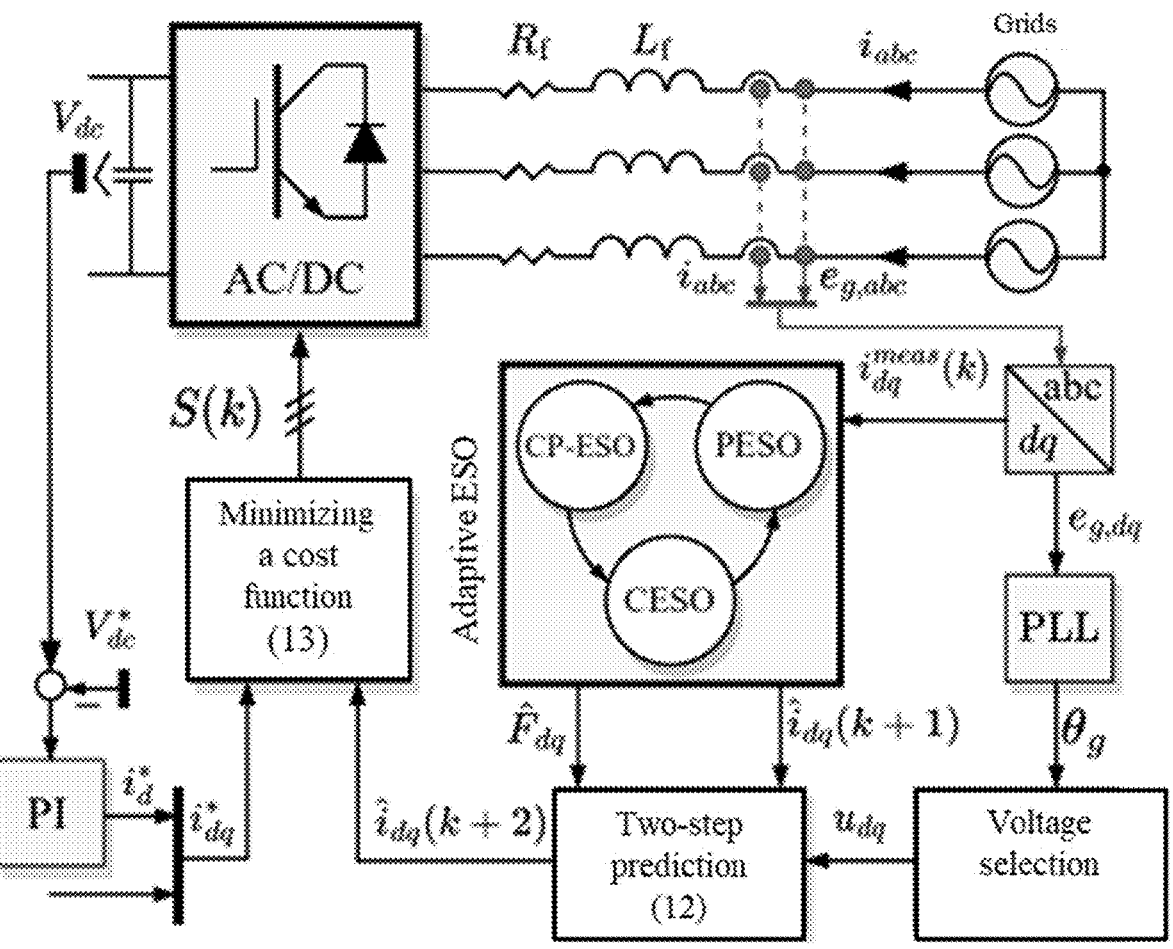
FIG. 4 is a schematic diagram of a predictive control method of the grid-connected converter based on a structurally adaptive ESO in an example of the present invention.

In one or more embodiments, disclosed in combination with FIG. 4 is a predictive control method of a grid-connected converter based on a structurally adaptive ESO, specifically comprising the following process:

Step (1): obtaining data of a grid current and a grid voltage and converting the data to data in a dq coordinate system;

FIG. 1 shows a structurally schematic diagram of a three-phase grid-connected converter. A schematic diagram of a grid-connected power converter has the following dynamic model:

$$L\frac{di_{abc}}{dt} = Ri_{abc} - e_{gabc} + u_{abc} \tag{1}$$

Wherein $i_{abc}$ is the grid current, $e_{gabc}$ is the grid voltage; $u_{abc} = f(S_{abc})$ represents an output voltage of the power converter and is a function of a switching state $S_{abc}$; L represents filter inductance, R represents filter resistance.

Formula (1) can be converted into:

$$\frac{di_{abc}}{dt} = F(t) + \alpha u_{abc}(t) \tag{2}$$

Wherein $u_{abc}$ is a control input of the converter, $$\alpha = \frac{1}{L}$$

is a constant control input gain, $$F = \frac{R}{L}(i_{abc} - e_{gabc}).$$

In this example, obtaining the data of the grid current $i_{abc}$ and the grid voltage $e_{gabc}$ and converting the data to data in the dq coordinate system, so as to obtain a current $$i_{dq}^{meas}$$

and a voltage $e_{dq}$ in the dq coordinate system.

Step (2): calculating, by using a phase locked loop (PLL) module, a voltage angle of the grid based on a voltage in the dq coordinate system. A voltage vector $u_{dq}$ is selected by applying the voltage phase angle of the grid.

Step (3): adaptively inputting the current in the dq coordinate system to a parallel ESO, a cascade ESO, or a hybrid cascade-parallel ESO, so as to obtain a current predicted current value $\hat{i}_{dq}(k+1)$ and estimated total disturbance $\hat{F}_{dq}$;

In this example, the total disturbance F is adaptively estimated using the following three ESOs: the parallel ESO (PESO), the cascade ESO (CESO), and the hybrid cascade-parallel ESO (CP-ESO).

The three ESOs are described below:

(3-1) the Parallel ESO (PESO)

Figure 2A:
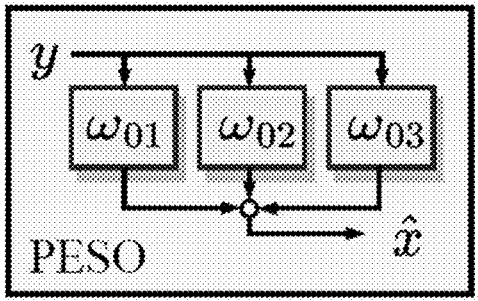
FIG. 2A, FIG. 2B, and FIG. 2C are respectively schematic diagrams of ESOs in parallel, cascade and hybrid cascade-parallel in examples of the present invention.

As shown in FIG. 2A, the PESO is described in a time domain as follows:

$$\begin{cases} \dot{\hat{z}}_j(t) = \hat{F}_j(t) + \alpha u(t) - \gamma_{1j}[\hat{z}_j(t) - y(t)] \\ \dot{\hat{F}}_j(t) = -\gamma_{2j}[\hat{z}_j(t) - y(t)] \end{cases} \tag{3}$$

Wherein $\hat{z}_j(t) \rightarrow \hat{i}_{dq,j}(t)$ is an estimated state, $$y(t) \rightarrow i_{dq}^{meas}(t)$$

is a measured output signal of noise, and $\{\gamma_{1j}, \gamma_{2j}\} \forall j \in [1,2,3]$ is a gain of the observer of $ESO_j$. The gain of the observer is further defined as follows:

$$\gamma_{11} = 2\omega_{01}, \gamma_{21} = \omega_{01}^2, \gamma_{12} = 2\omega_{02}, \gamma_{22} = \omega_{02}^2, \gamma_{13} = 2\omega_{03},$$

$$\gamma_{23} = \omega_{03}^2; \omega_{01} = \frac{\omega_0}{M^2}, \omega_{02} = \frac{\omega_0}{M}, \omega_{03} = \omega_0; \omega_0$$

is a total bandwidth of the ESO system.

It should be noted that $z_j; j \in \{1,2,3\}$ is an ESO state variable for estimating the current $\hat{i}_{dq,j}$.

In addition, three sub-frequencies satisfy: $\omega_{01} < \omega_{02} < \omega_{03} = \omega_0$.

The PESO is implemented on a digital signal processor (or a microcontroller) as follows:

$$\begin{cases} [\hat{z}_j(k+1) = [\hat{z}_j(k) + T_s[\hat{F}_j(k) + \alpha u(k)] - T_s\gamma_{1j}[\hat{z}_j(k) - y(k)] \\ \hat{F}_j(k+1) = -T_s\gamma_{2j}[\hat{z}_j(k) - y(k)] \end{cases} \tag{4}$$

Wherein k is a discrete moment, $T_s$ is sampling time, $\hat{z}_j(tk) \rightarrow \hat{i}_{dq,j}(k)$ is an estimated state, $$y(k) \rightarrow i_{dq}^{meas}(k)$$

is the measured output signal of the noise, and all other variables are described as above.

A corresponding current prediction in a first step:

$$\hat{i}_{dq}(k+1) = \tag{5}$$

$$\hat{i}_{dq}(k) + T_S\left[\sum_{j=1}^{3}\hat{F}_j(k) + \alpha u(k)\right] - T_s(\gamma_{11} + \gamma_{12} + \gamma_{13})\left[\hat{i}_{dq}(k) - i_{dq}(k)\right]$$

(3-2) the Cascade ESO (CESO)

Figure 2B:
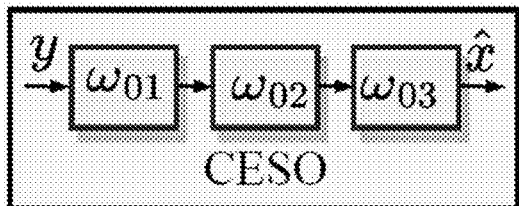

As shown in FIG. 2B, the CESO is described in the time domain as follows:

$$\begin{cases} \dot{\hat{z}}_1(t) = \hat{F}_1(t) + \alpha u(t) - \gamma_{11}[\hat{z}_1(t) - y(t)] \\ \dot{\hat{F}}_1(t) = -\gamma_{21}[\hat{z}_1(t) - y(t)] \\ \dot{\hat{z}}_j(t) = \sum_{1}^{j}\hat{F}_j(t) + \alpha u(t) - \gamma_{1j}[\hat{z}_j(t) - \hat{z}_{j-1}(t)]\forall \ j \in \{2,3\} \\ \dot{\hat{F}}_j(t) = -\gamma_{2j}[\hat{z}_j(t) - \hat{z}_{j-1}(t)] \end{cases} \tag{6}$$

Wherein $\hat{z}_j(t)$ is an ESO state variable of an estimated current predicted current $\hat{i}_{dq,j}(t)$, $\dot{\hat{z}}_j(t)$ is a first order derivative with respect to $\hat{z}_j(t)$ time, and u(t) is a controller $$\text{input} \cdot y(t) \rightarrow i_{dq}^{meas}(t)$$

is the measured output signal of noise, and $\gamma_{1j}$, $\gamma_{2j}\}\forall j \in [1,2,3]$ is the gain of the observer of $ESO_j$.

The gain of the observer is further defined as $$\gamma_{11} = 2\omega_{01}, \ \gamma_{21} = \omega_{01}^2, \ \gamma_{12} = 2\omega_{02}, \ \gamma_{22} = \omega_{02}^2, \ \gamma_{13} = 2\omega_{03},$$

$$\gamma_{23} = \omega_{03}^2; \omega_{01} = \frac{\omega_0}{M^2}, \ \omega_{02} = \frac{\omega_0}{M}, \ \omega_{03} = \omega_0; \omega_0$$

is a total bandwidth of an ESO system.

It should be noted that $z_j$:j$\in$\{1,2,3\} is an ESO state variable for estimating the current $\hat{i}_{dq,j}$.

In addition, three sub-frequencies satisfy: $\omega_{01} < \omega_{02} < \omega_{03} = \omega_0$.

The CESO is implemented on the digital signal processor (or the microcontroller) as follows:

$$\hat{z}_1(k+1) = \hat{F}_1(k) + \alpha u(k) - \gamma_{11}[\hat{z}_1(k) - y(k)] \tag{7}$$

$$\hat{F}_1(k+1) = -\gamma_{21}[\hat{z}_1(k) - y(k)]$$

$$\hat{z}_j(k+1) = \sum_{1}^{j}\hat{F}_j(k) + \alpha u(k) - \gamma_{1j}[\hat{z}_j(k) - \hat{z}_{j-1}(k)]\forall \ j \in \{2,3\}$$

$$\hat{F}_j(k+1) = -T_s\gamma_{2j}[\hat{z}_j(k) - \hat{z}_{j-1}(k)]$$

Wherein k is the discrete moment, $T_s$ is the sampling time, $\hat{z}_j(t)$ is the ESO state variable of an estimated current predicted current $$\hat{i}_{dq,j}(t), y(k) \rightarrow i_{dq}^{meas}(k)$$

is the measured output signal of the noise, and all other variables are described as above. $\hat{F}_j(k+1)$ is a predicted disturbance value of a jth sub-frequency level $\omega_{0j}$ in a first step.

A corresponding current prediction in the first step is as follows:

$$\hat{i}_{dq}(k+1) = \hat{i}_{dq}(k) + T_S\left[\sum_{j=1}^{3}\hat{F}_j(k) + \alpha u(k)\right] - T_s\gamma_{13}\left[\hat{i}_{dq,3}(k) - \hat{i}_{dq,2}(k)\right] \tag{8}$$

(3-3) ESO in Cascade Parallel (CP-ESO)

Figure 2C:
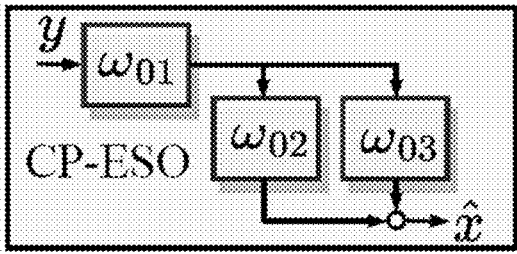

As shown in FIG. 2C, the CP-ESO is described in the time domain as follows:

$$\begin{cases} \dot{\hat{z}}_1(t) = \hat{F}_1(t) + \alpha u(t) - \gamma_{11}(\hat{z}_1(t) - y(t)) \\ \dot{\hat{F}}_1(t) = -\gamma_{21}(\hat{z}_1(t) - y(t)) \\ \dot{\hat{z}}_2(t) = \sum_{j=1}^{2}\hat{F}_j(t) + \alpha u(t) - \gamma_{12}[\hat{z}_2(t) - \hat{z}_1(t)] \\ \dot{\hat{F}}_2(t) = -\gamma_{22}[\hat{z}_2(t) - \hat{z}_1(t)] \\ \dot{\hat{z}}_3(t) = \sum_{j=1}^{3}\hat{F}_j(t) + \alpha u(t) - \gamma_{13}[\hat{z}_3(t) - \hat{z}_1(t)] \\ \dot{\hat{F}}_3 = -\gamma_{23}[\hat{z}_3(t) - \hat{z}_1(t)] \end{cases} \tag{9}$$

Wherein $\hat{z}_j(t)$ is an ESO state variable of an estimated current predicted current $\hat{i}_{dq,j}(t)$, y(t) is the measured output signal of noise, and $\gamma_{1j}$, $\gamma_{2j}\}\forall j \in [1,2,3]$ is the gain of the observer of $ESO_j$. The gain of the observer is further defined as follows:

$$\gamma_{11} = 2\omega_{01}, \ \gamma_{21} = \omega_{01}^2, \ \gamma_{12} = 2\omega_{02}, \ \gamma_{22} = \omega_{02}^2,$$

$$\gamma_{13} = 2\omega_{03}, \ \gamma_{23} = \omega_{03}^2; \omega_{01} = \frac{\omega_0}{M^2}, \ \omega_{02} = \frac{\omega_0}{M}, \ \omega_{03} = \omega_0;$$

$\omega_0$ is a total bandwidth of the ESO system.

It should be noted that $z_j$:j$\in$\{1,2,3\} is an ESO state variable for estimating the current $\hat{i}_{dq,j}$.

In addition, three sub-frequencies satisfy: $\omega_{01} < \omega_{02} < \omega_{03} = \omega_0$.

The CP-ESO is implemented on the digital signal processor (or the microcontroller) as follows:

$$\begin{cases} \hat{z}_1(k+1) = \hat{z}_1(k) + T_s\{\hat{F}_1(k) + \alpha u(k) - \gamma_{11}(\hat{z}_1(k) - y(k))\} \\ \hat{F}_1(k+1) = \hat{F}_1(k) - T_s\gamma_{21}(\hat{z}_1(t) - y(t)) \\ \hat{z}_2(k+1) = \hat{z}_2(k) + T_s\sum_{j=1}^{2}\hat{F}_j(k) + T_s\alpha u(k) - T_s\gamma_{12}[\hat{z}_2(k) - \hat{z}_1(k)] \\ \hat{F}_2(k+1) = \hat{F}_2(k) - T_s\gamma_{22}[\hat{z}_2(k) - \hat{z}_1(k)] \\ \hat{z}_3(k+1) = \hat{z}_3(k) + T_s\sum_{j=1}^{3}\hat{F}_j(k) + T_s\alpha u(k) - T_s\gamma_{13}[\hat{z}_3(k) - \hat{z}_1(k)] \\ \hat{F}_3(k+1) = \hat{F}_3(k) - T_s\gamma_{23}[\hat{z}_3(k) - \hat{z}_1(k)] \end{cases} \tag{10}$$

Wherein k is the discrete moment, $T_s$ is the sampling time, $\hat{z}_j(tk) \rightarrow \hat{i}_{dq,j}(k)$ is the estimated state $$y(k) \rightarrow i_{dq}^{meas}(k)$$

is the measured output signal of the noise, and all other variables are described as above.

A corresponding current prediction in the first step:

$$\hat{i}_{dq}(k+1) = \tag{11}$$

$$\hat{i}_{dq}(k) + T_S\left[\sum_{j=1}^{3}\hat{F}_j(k) + \alpha u(k)\right] - T_s(\gamma_{12} + \gamma_{13})\left[\hat{i}_{dq,2}(k) - \hat{i}_{dq,1}(k)\right]$$

PESO has the best disturbance rejection capability. Therefore, it is most useful during device startup and when external disturbance is detected. It may minimize a peak current during transients. The CESO has the best noise suppression characteristics and would be applied during steady-state operations of the system. The CP-ESO would only be applied during transition from the PESO to the CESO.

Combined with FIG. 3, this example adaptively selects the observer by measuring a d-axis current $i_d$, and a specific process is as follows:

Determining whether a d-axis current component in the dq coordinate system is a starting current or a disturbance current; if yes, firstly predicting the current predicted current value and the estimated total disturbance by using the parallel ESO according to the current in the dq coordinate system; after ½ cycle, predicting the current predicted current value and the estimated total disturbance by using a hybrid cascade-parallel ESO (a bandwidth is $5\omega_0$); after ½ cycle, predicting the current predicted current value and the estimated total disturbance by using a hybrid cascade-parallel ESO (a bandwidth is $3\omega_0$); after ½ cycle, predicting the current predicted current value and the estimated total disturbance by using the cascade ESO; after preset cycles (such as 3 cycles), returning to obtaining the d-axis current component in the dq coordinate system again; if not, firstly predicting the current predicted current value and the estimated total disturbance by directly using the cascade ESO according to the current in the dq coordinate system.

In this example, when the following formula is true, the starting current or disturbance current appears:

$$\Delta i_{d\_4} = \left|\int_0^{\tau\_4}\frac{d}{dt}i_d d\tau\right| \geq 0.01 i_{d\_max}$$

Wherein $\Delta i_{d\_4}$ is an absolute change value of the d-axis gate current $i_d$ after 4 times of sampling of the d-axis gate current, $t\_4 = 4/T_s$; $T_s$ is the sampling time and $i_{d\_max}$ is a maximum d-axis grid current.

For a microcontroller implementation, it is discretized to:

$$\Delta i_{d\_4} = \left|\sum_{k=1}^{4}[i_d(k) - i_d(k-1)]\right| \geq 0.01 i_{d\_max}$$

Wherein $\Delta i_{d\_4}$ is the absolute change of the current after four times of sampling, k is the discrete sampling instant, $i_{d\_max}$ is the maximum d-axis grid current.

Step (4): carrying out a two-step grid current prediction based on the current predicted current value, the estimated total disturbance and the selected voltage vector;

In this example, a predicted current $\hat{i}_{dq}(k+2)$ in a second step is calculated using $\hat{i}_{dq}(k+1)$, $\hat{F}_{dq}$ and $u_{dq}$ for equation (6). The predicted current $i_{dq}(k+2)$ and a reference current calculated using a PI controller are passed to a cost function stage.

Figure 3:
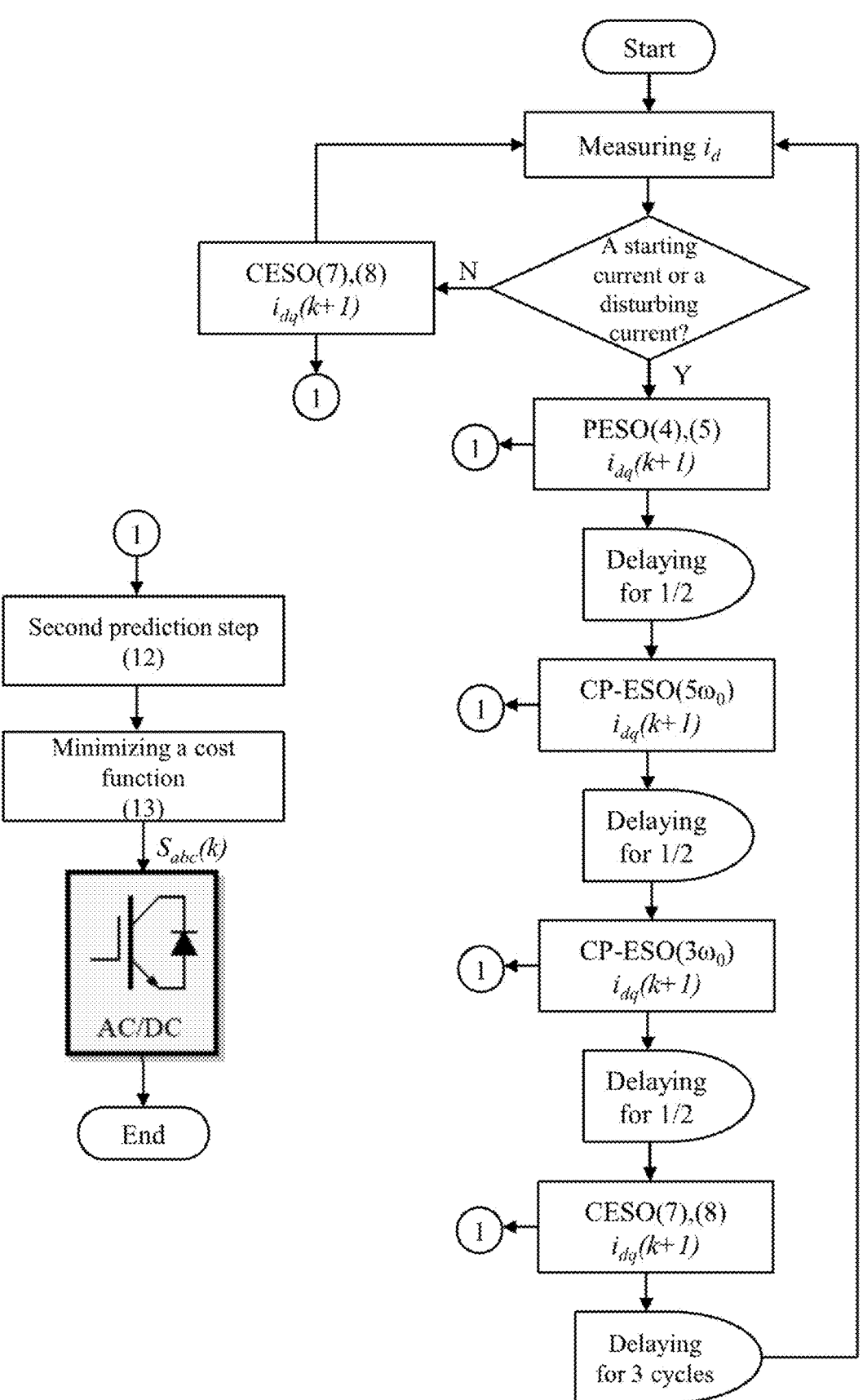
FIG. 3 is a flow chart of adaptive ESO structure transition in an example of the present invention.

In combination with FIG. 3, the predicted current at the current timing in the first step is obtained using step (3), which is obtained after discretizing the ESO (for PESO (5) or CESO (8) or CP-ESO (11)).

The currently active ESO (for PESO (5) or CESO (8) or CP-ESO (11)), $\hat{i}_{dq}(k+1)$ and $$\sum_{j=1}^{3}\hat{F}_j(k+1)$$

are provided to calculate the prediction $\hat{i}_{dq}(k+2)$ in the second step in equation (12).

The predicted current in the second step is as follows:

$$\hat{i}_{dq}(k+2) = \hat{i}_{dq}(k+1) + T_S\left[\sum_{j=1}^{3}\hat{F}_j(k+1) + \alpha u(k)\right] \tag{12}$$

Wherein k is the sampling instant, $T_s$ is the sampling time, $$\gamma_{12} = 2\omega_{02}, \gamma_{13} = 2\omega_{03}, \omega_{01} = \frac{\omega_0}{M^2}, \omega_{02} = \frac{\omega_0}{M}, \omega_{03} = \omega_0;$$

$\omega_0$ is the bandwidth system of the entire ESO, $\hat{i}_{dq}(k+1)$ is the predicted estimated value of the grid current at the next sampling instant $(k+1)$, $\hat{i}_{dq}(k)$ is the estimated current of the current discrete sample (k), $T_s$ is the sampling time, $\alpha = 1/L$, u(k) is selected from Table 1.

A voltage $S_{abc}(k)$ of the converter caused by the switching state of $i_{dq}(k)$ is a measured current of the current sampling time and $\hat{F}(k)$ is the estimated disturbance in the ESO bandwidth.

Step (5): taking minimizing a cost function as a control target, so as to obtain an optimal voltage vector based on a two-step grid current prediction result, and carrying out switching control of the grid-connected converter.

In this example, minimizing the cost function is specifically:

$$J = \left[\hat{i}_{dq}(k+2) - i_{dq}^*(k+2)\right]^2 \tag{13}$$

Wherein $$i_q^* = 0,$$

and $$i_d^* = i_d + (V_{dc} - V_{dc}^*)\left(k_p + \frac{k_i}{s}\right);$$

$k_p$, $k_i$ are the adjusted $V_{dc}$ PI controller gain, a DC bus voltage, $$V_{dc}^*$$

is a DC bus voltage reference.

For n={0, 1, ..., 7} in table 1, a voltage of each switching state corresponds to n={0, 1, ..., 7}, and the voltage $u_{dq}$ of each switching state is evaluated in the cost function. Among these 8 options, a voltage which obtains a minimum J is applied as the switching state $S_{abc}$ of the power converter. Evaluation is carried out in the cost function. Among these 8 options, the voltage which obtains the minimum J is applied as the switching state of the power converter.

TABLE 1

| Switching states of a power converter | | |
|---|---|---|
| n | S abc | u dq = T park. u abc |
| 0 | 000 | $0 + j0$ |
| 1 | 100 | $\dfrac{V_{dc}}{3}(2 + j0)$ |
| 2 | 110 | $\dfrac{V_{dc}}{3}(1 + j\sqrt{3})$ |
| 3 | 010 | $\dfrac{V_{dc}}{3}(-1 + j\sqrt{3})$ |
| 4 | 011 | $\dfrac{V_{dc}}{3}(-2 + j0)$ |
| 5 | 001 | $\dfrac{V_{dc}}{3}(-1 - j\sqrt{3})$ |
| 6 | 101 | $\dfrac{V_{dc}}{3}(1 - j\sqrt{3})$ |
| 7 | 111 | $0 + j0$ |

Figure 5:
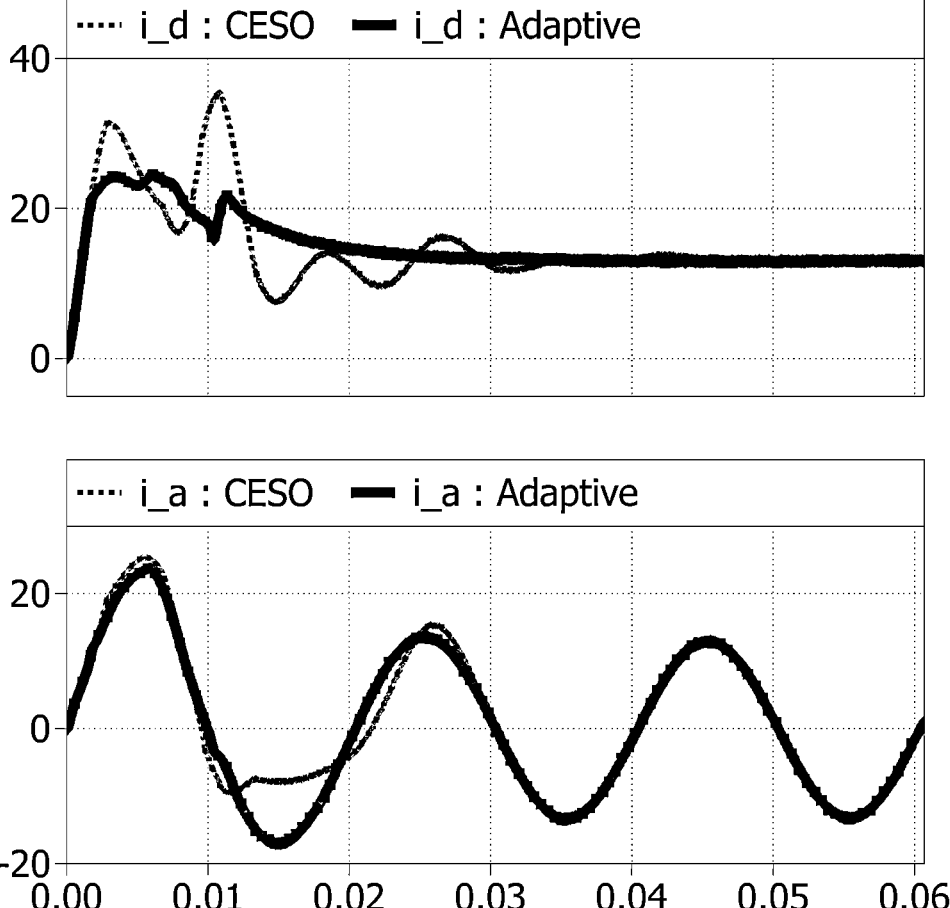
FIG. 5 shows comparative performance of an adaptive ESO observer and a CESO observer during startup of a power converter in the example.

FIG. 5 shows comparative performance of an adaptive ESO observer and a CESO observer during startup of a power converter in the example. The upper figure in FIG. 5 shows the d-axis current. It can be seen that the peak d-axis current produced by the traditional method (CESO) is 35.55 A, while the peak current produced by the method in this example is lower, which is 24.55 A. The lower figure in FIG. 5 shows an A phase current, and it can be seen that the method in this example significantly reduces a transient ripple and oscillation compared to the traditional method. This shows the effectiveness of the solution.

Example 2

In one or more embodiments, disclosed is a predictive control system of a grid-connected converter based on a structurally adaptive ESO, comprising: a data obtaining module, configured for obtaining data of a grid current and a grid voltage and converting the data to data in a dq coordinate system; a voltage vector selecting module, configured for calculating a selected voltage vector based on a voltage in the dq coordinate system; an adaptive state observing module, configured for adaptively inputting a current in the dq coordinate system to a parallel ESO, a cascade ESO, or a hybrid cascade-parallel ESO, so as to obtain a current predicted current value and estimated total disturbance; a two-step predicting module, configured for carrying out a two-step grid current prediction based on the current predicted current value, the estimated total disturbance and the selected voltage vector; a grid-connected converter controlling module, configured for taking minimizing a cost function as a control target, so as to obtain an optimal voltage vector based on a two-step grid current prediction result, and carrying out switching control of the grid-connected converter.

It should be noted that the specific implementation of the above modules has been explained in detail in example 1, and would not be detailed.

Example 3

In one or more embodiments, disclosed is a terminal device comprising a server, the server comprises a memory, a processor, and a computer program stored on the memory and capable of being executed by the processor, and the predictive control method of a grid-connected converter based on a structurally adaptive ESO in example 1 is implemented when the processor executes the program. For the sake of concise, it would not be repeated herein.

It should be understood that in this example, the processor may be a central processing unit (CPU), the processor may also be another general-purpose processor, a digital signal processor (DSP), an application-specific integrated circuit (ASIC), a field programmable gate array (FPGA) or another programmable logic device, a discrete gate or transistor logic device, a discrete hardware component, etc. The general-purpose processor may be a microprocessor or the processor may also be any conventional processor, etc.

The memory may include a read-only memory and a random access memory and provide instructions and data to the processor, and part of the memory may also include a non-volatile random access memory. For example, the memory may also store information of a device type.

In an embodiment process, the steps of the above method can be completed by an integrated logic circuit of a hardware in the processor or instructions in the form of a software.

Example 4

In one or more embodiments, disclosed is a computer-readable storage medium in which a plurality of instructions are stored, wherein the instructions are suitable for being loaded by a processor of a terminal device and executing the predictive control method of a grid-connected converter based on a structurally adaptive ESO in example 1.

Although the above describes the specific embodiments of the present invention in combination with the attached drawings, it is not a limitation of the protection scope of the present invention, and a person skilled in the art should understand that on the basis of the technical solutions of the present invention, various modifications or variants that can be made by a person skilled in the art without creative labor are still within the protection scope of the present invention.

What is claimed is:

1. A predictive control method of a grid-connected converter based on a structurally adaptive extended state observer (ESO), comprising:

obtaining data of a grid current and a grid voltage and converting the data to data in a dq coordinate system;

calculating a selected voltage vector based on a voltage in the dq coordinate system;

adaptively inputting a current in the dq coordinate system to a parallel ESO, a cascade ESO, or a hybrid cascade-parallel ESO, so as to obtain a current predicted current value and estimated total disturbance;

carrying out a two-step grid current prediction based on the current predicted current value, the estimated total disturbance and the selected voltage vector;

taking minimizing a cost function as a control target, so as to obtain an optimal voltage vector based on a two-step grid current prediction result, and carrying out switching control of the grid-connected converter;

wherein adaptively inputting the current in the dq coordinate system to a parallel ESO, a cascade ESO, or a hybrid cascade-parallel ESO, so as to obtain a current predicted current value and estimated total disturbance includes:

determining whether a d-axis current component in the dq coordinate system is a starting current or a disturbance current;

if yes, firstly predicting the current predicted current value and the estimated total disturbance by using the parallel ESO according to the current in the dq coordinate system; after ½ cycle, predicting the current predicted current value and the estimated total disturbance by using a hybrid cascade-parallel ESO with a first set bandwidth; after another ½ cycle, predicting the current predicted current value and the estimated total disturbance by using a hybrid cascade-parallel ESO with a second set bandwidth; after another ½ cycle, predicting the current predicted current value and the estimated total disturbance by using the cascade ESO; after setting a delay for a plurality of cycles, returning to obtaining the d-axis current component in the dq coordinate system again;

if not, firstly predicting the current predicted current value and the estimated total disturbance by directly using the cascade ESO according to the current in the dq coordinate system;

wherein carrying out a two-step grid current prediction based on the current predicted current value, the estimated total disturbance and the selected voltage vector includes:

the current predicted current value is a result obtained after adaptively inputting to the parallel ESO, the cascade ESO or the hybrid cascade-parallel ESO, that is, a result obtained in a first prediction step;

a result of a second current prediction step is as follows:

$$\hat{i}_{dq}(k+2) = \hat{i}_{dq}(k+1) + T_S\left[\sum_{j=1}^{3}\hat{F}_j(k+1) + \alpha u(k)\right]$$

wherein k is sampling instant, $T_s$ is sampling time, $\hat{i}dq$ (k+1) is the result obtained in the first prediction step and is a predicted estimated value of the grid current at the next sampling instant (k+1), $\alpha$ is a constant control input gain, u(k) is a voltage of the converter caused by a switching state Sabc(k); $\hat{F}_j$(k+1) represents a predicted disturbance value of the first step at a jth sub-frequency level $\omega_{0j}$, wherein j∈[1,2,3];

wherein taking minimizing a cost function as the control target, so as to obtain the optimal voltage vector, the cost function includes:

$$J = \left[\hat{i}_{dq}(k+2) - i^*_{dq}(k+2)\right]^2$$

wherein $\hat{i}_{dq}$(k+2) is a predicted estimated value of the grid current at sampling instant (k+2), and $$i^*_{dq}(k+2)$$

is a reference value of the grid current at the sampling instant (k+2), wherein each switching state voltage of a three-phase two-level grid-connected converter is evaluated in the cost function; and a switching state corresponding to a voltage $u_{dq}$ with the minimum value of the cost function is applied as the switching state Sabe of the grid-connected converter.

2. The predictive control method of the grid-connected converter based on the structurally adaptive ESO according to claim 1, wherein determining whether a d-axis current component in the dq coordinate system is a starting current or a disturbance current includes:

when the following formula is satisfied, the starting current or disturbance current appears:

$$\Delta i_{d\_4} = \left|\int_0^{\tau\_4} \frac{d}{dt}i_d d\tau\right| \geq 0.01 i_{d\_max}$$

wherein $\Delta i_{d\_4}$ is an absolute change value of the d-axis current $i_d$ after 4 times of sampling of the d-axis current, t_4=4/$T_s$ and, $T_s$ is the sampling time, and $i_{d\_max}$ is a maximum d-axis grid current.

3. The predictive control method of the grid-connected converter based on the structurally adaptive ESO according to claim 1, wherein the hybrid cascade-parallel ESO is as follows:

$$\dot{\hat{z}}_1(t) = \hat{F}_1(t) + \alpha u(t) - \gamma_{11}(\hat{z}_1(t) - y(t))$$

$$\dot{\hat{F}}_1(t) = -\gamma_{21}(\hat{z}_1(t) - y(t))$$

$$\dot{\hat{z}}_2(t) = \sum_{j=1}^{2}\hat{F}_j(t) + \alpha u(t) - \gamma_{12}[\hat{z}_2(t) - \hat{z}_1(t)]$$

$$\dot{\hat{F}}_2(t) = -\gamma_{22}[\hat{z}_2(t) - \hat{z}_1(t)]$$

$$\dot{\hat{z}}_3(t) = \sum_{j=1}^{3}\hat{F}_j(t) + \alpha u(t) - \gamma_{13}[\hat{z}_3(t) - \hat{z}_1(t)]$$

$$\dot{\hat{F}}_3 = -\gamma_{23}[\hat{z}_3(t) - \hat{z}_1(t)]$$

wherein $\dot{\hat{z}}_j$(t) is a first order derivative of time $\hat{z}_j$(t), $\hat{z}_j$(t) is an ESO state variable of an estimated current predicted current $\hat{i}_{dq,j}$(t), y(t) is a measured noisy output signal, {$Y_{1j}$, $Y_{2j}$} is a gain of an ESO of ESO$_j$, wherein j∈[1,2,3]; $\omega_0$=is a total bandwidth of an ESO system, $\alpha$ is a gain of a constant control input; u(t) is a controller input.

4. A predictive control system of a grid-connected converter based on a structurally adaptive ESO, comprising:

a data obtaining module, configured for obtaining data of a grid current and a grid voltage and converting the data to data in a dq coordinate system;

a voltage vector selecting module, configured for calculating a selected voltage vector based on a voltage in the dq coordinate system;

an adaptive state observing module, configured for adaptively inputting a current in the dq coordinate system to a parallel ESO, a cascade ESO, or a hybrid cascade-parallel ESO, so as to obtain a current predicted current value and estimated total disturbance;

a two-step predicting module, configured for carrying out a two-step grid current prediction based on the current predicted current value, the estimated total disturbance and the selected voltage vector;

a grid-connected converter controlling module, configured for taking minimizing a cost function as a control target, so as to obtain an optimal voltage vector based on a two-step grid current prediction result, and carrying out switching control of the grid-connected converter;

wherein adaptively inputting the current in the dq coordinate system to a parallel ESO, a cascade ESO, or a hybrid cascade-parallel ESO, so as to obtain a current predicted current value and estimated total disturbance includes:

determining whether a d-axis current component in the dq coordinate system is a starting current or a disturbance current;

if yes, firstly predicting the current predicted current value and the estimated total disturbance by using the parallel ESO according to the current in the dq coordinate system; after ½ cycle, predicting the current predicted current value and the estimated total disturbance by using a hybrid cascade-parallel ESO with a first set bandwidth; after another ½ cycle, predicting the current predicted current value and the estimated total disturbance by using a hybrid cascade-parallel ESO with a second set bandwidth; after another ½ cycle, predicting the current predicted current value and the estimated total disturbance by using the cascade ESO; after setting a delay for a plurality of cycles, returning to obtaining the d-axis current component in the dq coordinate system again;

if not, firstly predicting the current predicted current value and the estimated total disturbance by directly using the cascade ESO according to the current in the dq coordinate system;

wherein carrying out a two-step grid current prediction based on the current predicted current value, the estimated total disturbance and the selected voltage vector includes:

the current predicted current value is a result obtained after adaptively inputting to the parallel ESO, the cascade ESO or the hybrid cascade-parallel ESO, that is, a result obtained in a first prediction step;

a result of a second current prediction step is as follows:

$$\hat{i}_{dq}(k+2) = \hat{i}_{dq}(k+1) + T_S\left[\sum_{j=1}^{3}\hat{F}_j(k+1) + \alpha u(k)\right]$$

wherein k is sampling instant, $T_s$ is sampling time, $\hat{i}_{dq}(k+1)$ is the result obtained in the first prediction step and is a predicted estimated value of the grid current at the next sampling instant (k+1), $\alpha$ is a constant control input gain, u(k) is a voltage of the converter caused by a switching state Sabc(k); $\hat{F}_j(k+1)$ represents a predicted disturbance value of the first step at a jth sub-frequency level $\omega_{0j}$, wherein $j \in [1,2,3]$;

wherein taking minimizing a cost function as the control target, so as to obtain the optimal voltage vector, the cost function includes:

$$J = \left[\hat{i}_{dq}(k+2) - i^*_{dq}(k+2)\right]^2$$

wherein $\hat{i}_{dq}(k+2)$ is a predicted estimated value of the grid current at sampling instant (k+2), and $$i^*_{dq}(k+2)$$

is a reference value of the grid current at the sampling instant (k+2), wherein each switching state voltage of a three-phase two-level grid-connected converter is evaluated in the cost function; and a switching state corresponding to a voltage $u_{dq}$ with the minimum value of the cost function is applied as the switching state Sabe of the grid-connected converter.

5. A terminal device, comprising a processor and a memory, wherein the processor is used to implement a plurality of instructions; and the memory is used to store the plurality of instructions, the plurality of instructions are suitable for being loaded by the processor and executing the predictive control method of the grid-connected converter based on the structurally adaptive ESO according to claim 1.

6. A non-transitory computer-readable storage medium in which a plurality of instructions are stored, the plurality of instructions are suitable for being loaded by a processor of a terminal device and executing the predictive control method of the grid-connected converter based on the structurally adaptive ESO according to claim 1.

\* \* \* \* \*